(12) United States Patent
Connors

(10) Patent No.: US 9,217,516 B2
(45) Date of Patent: Dec. 22, 2015

(54) PIPELINE BALLAST DEVICE

(71) Applicant: Pipesak Inc., London (CA)

(72) Inventor: Geoff Weyman Connors, London (CA)

(73) Assignee: PIPESAK INC., London, Ontario (CA)

( * ) Notice: Subject to any disclaimer, the term of this patent is extended or adjusted under 35 U.S.C. 154(b) by 0 days.

(21) Appl. No.: 14/195,553

(22) Filed: Mar. 3, 2014

(65) Prior Publication Data

US 2014/0255104 A1  Sep. 11, 2014

Related U.S. Application Data

(60) Provisional application No. 61/773,345, filed on Mar. 6, 2013.

(51) Int. Cl.
   *F16L 1/06* (2006.01)
   *F16L 1/24* (2006.01)

(52) U.S. Cl.
   CPC .... *F16L 1/06* (2013.01); *F16L 1/24* (2013.01)

(58) Field of Classification Search
   CPC ...................................... F16L 1/06; F16L 1/24
   USPC .................... 405/184.4; 383/24, 33, 105, 903
   See application file for complete search history.

(56) References Cited

U.S. PATENT DOCUMENTS

| | | | |
|---|---|---|---|
| 3,170,663 A | 2/1965 | Fite | |
| 3,993,192 A * | 11/1976 | Bunn | 206/515 |
| 4,477,206 A * | 10/1984 | Papetti et al. | 405/172 |
| 4,770,564 A * | 9/1988 | Dison | 405/288 |
| 5,160,218 A * | 11/1992 | Hill | 405/184.4 |
| 5,385,430 A | 1/1995 | Connonrs | |
| 5,785,175 A * | 7/1998 | Cholsaipant | 206/386 |
| 6,402,378 B1* | 6/2002 | Shackleton | 383/119 |
| 6,558,085 B1* | 5/2003 | Hall | 405/288 |
| 7,344,338 B2* | 3/2008 | Willis et al. | 405/172 |
| 7,862,256 B2* | 1/2011 | Sprague et al. | 405/184.4 |
| 8,262,320 B2 | 9/2012 | Gunn et al. | |
| 8,360,688 B2 | 1/2013 | Gunn et al. | |
| D711,210 S * | 8/2014 | Gentry | D8/349 |
| 2010/0189514 A1* | 7/2010 | Gunn et al. | 405/172 |
| 2010/0247249 A1* | 9/2010 | Skarbovig | 405/289 |

* cited by examiner

*Primary Examiner* — Benjamin Fiorello
(74) *Attorney, Agent, or Firm* — Andrus Intellectual Property Law, LLP

(57) ABSTRACT

The present disclosure describes a weighting device for a longitudinally extending conduit. The weighting device is made from a flexible material, preferably woven, and has a top loading main body for receiving ballast material. The main body has a pair of legs forming a conduit accepting space between them. The legs are adapted to be positioned in straddling relation over a conduit with said conduit being embraced in said conduit accepting space between the legs. The main body has at least one inner panel extending between the inner and outer sidewalls of each of the leg sections to prevent excessive bulging of the leg section when filled with ballast material. The panel divides the legs into compartments. Ballast introduced into the main body will flow into the compartments of the legs. The weighting device may also include filling and hoisting loops.

13 Claims, 1 Drawing Sheet

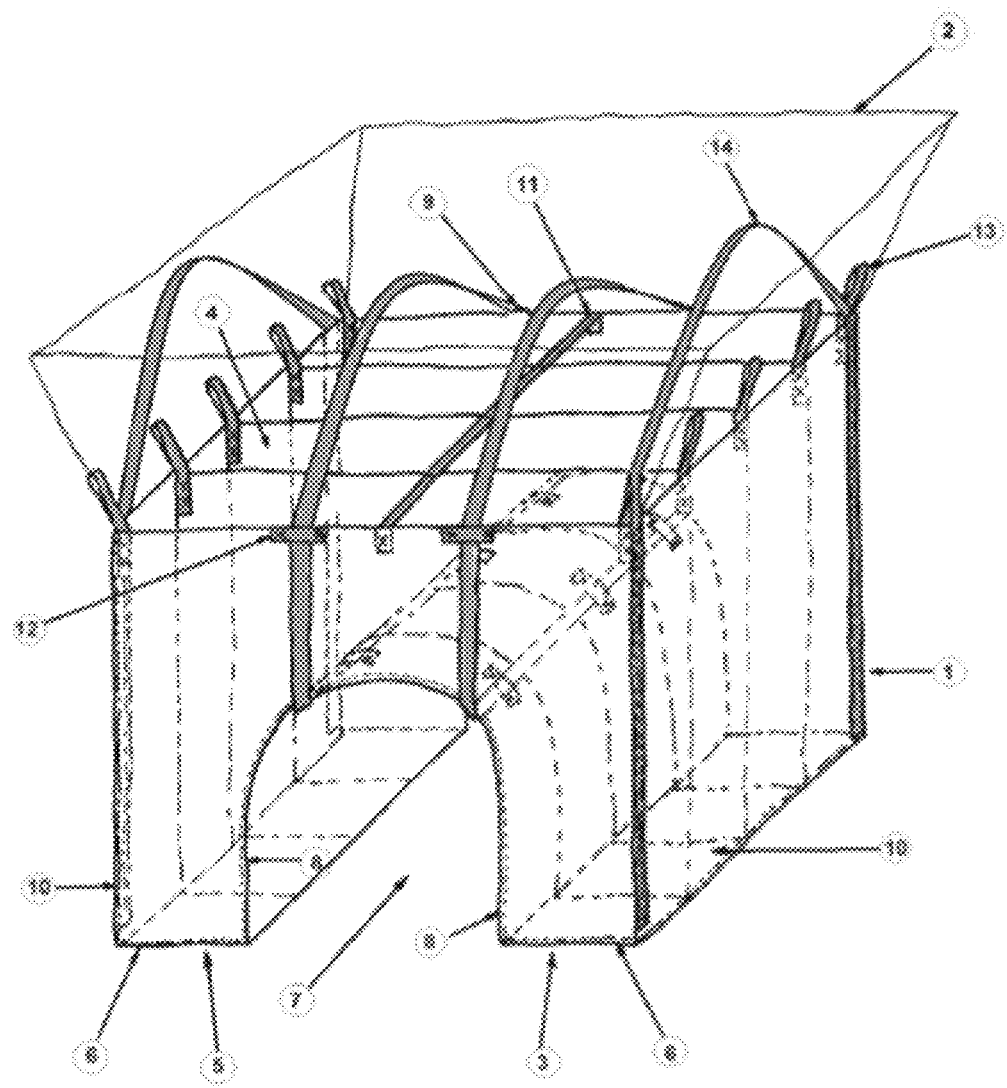

PIPELINE BALLAST DEVICE

CROSS REFERENCE TO RELATED APPLICATION

The present utility patent application claims the benefit of and priority to U.S. Provisional Patent Application Ser. No. 61/773,345, filed Mar. 6, 2013, which is incorporated herein by reference.

FIELD

The present disclosure relates generally to a pipeline weighting device. More particularly, the present invention relates to a device for countering post-installation buoyant displacement forces that may undesirably effect a pipeline emplacement, particularly in subterranean emplacements.

BACKGROUND

Pipeline emplacements are often subject to various forces, such as hydrodynamic and hydrostatic forces, which can manifest in the displacement of the pipeline from its originally installed position. Consequential pipeline rupture can have adverse environmental and financial repercussions.

Responsible pipeline companies and contractors are committed to installations whose designs provide for a high margin of design tolerance over and above any purely structural requirement for pipeline weighting. This abundance of caution is intended to offset the catastrophic potential attached to taking unwarranted risks that might lead to displacement and consequential pipeline damage, including service interruption, and environmental damage.

The traditional practice in the industry entails weighting the pipeline with massive concrete weights. Earlier designs include clamp-on weights of various descriptions, as well as the more typical large pre-cast concrete arch structures that are arranged in bridging relation over the top of the pipeline. At the same time, they are expensive to fabricate, transport, entail labour intensive installation practices, and generally require increased trench depth and width dimensions in order that their installation can be properly accommodated. Even though these weights are very expensive, the protection they afford in terms of securely anchoring a pipeline offsets their associated materials and installation costs. Although such weights might be used in any number of situations, they appear most commonly in in-ground installations.

One proposed alternative for dealing with the problem of maintaining the positioning of a pipeline within a subterranean emplacement is disclosed in U.S. Pat. No. 3,170,663 (Fite). This patent discloses an anchoring device for a pipeline, which incorporates an arcuate collar that is secured in straddling relation about the upper exterior surface of the pipeline. The collar is held in tensioned relation against that surface by a laterally spaced apart pair of anchoring rods having spiral flights thereon that extend beyond the undersurface of the pipeline and are adapted to positively engage the underlying soil substrate on either side thereof.

Another proposal entails the use, in muskeg environments, of simple sheets of fabric that are intended to be deployed in a pipeline trench, overlaying the installed pipeline. Backfill is then layered over the fabric in the hope that the collected "unit weight" of the resulting overburden will be sufficient to counter any buoyant forces that local ground water might exert on the pipeline. Resort to this approach has been entertained only when alternatives are simply not available, (ie in remote muskeg areas). Moreover, there is a risk that ground water flows will displace some of the "unit weight" of the "disturbed" backfill from above the pipeline. This would be a particular problem in areas where ground surface contours or the grading of the emplacement or a non-level transit of the pipeline, might result in either or both surface and ground water flows that could be channelled within the fabric, almost in the manner of an artificial canal.

More current designs use flexible bag-type weights. These bags are filled with ballast material, such as gravel and coarse sand.

One example of these flexible bag-type weights is shown in U.S. Pat. No. 5,385,430. This patent discloses a flexible bag system with two main compartments which are filled with ballast material, such as gravel and coarse sand, from the area where the pipeline is being laid. Once filled, the weight is positioned over the pipeline, with one compartment on each side of the pipeline, so that the bag straddles the pipeline and its weight will hold the pipeline in position. One disadvantage of this weight is that the main compartment may have excessive bulging when filled with ballast material.

Another example of a flexible bag-type weight for weighting pipelines is disclosed in U.S. Pat. Nos. 8,262,320 and 8,360,688. These patents disclose a flexible bag-type pipeline weight which straddles a pipeline and is filled with ballast material. The bag has two leg portions, extending on either side of a pipeline, and a center section above the pipeline. In the lower portions of the legs are multiple cables or cords extending between the outer and inner leg walls to prevent excessive bulging of the legs. It also includes filling loops and hoisting loops. The filling loops are positioned either on the inner face or the outer face of either the corresponding top section sidewall or the corresponding leg section outer sidewall, at or near the juncture between the top section sidewall and the leg section sidewall.

One disadvantage of this system is that the cables or cords in the legs are cumbersome. The cables or cords may not prevent excessive bulging of the legs when the weight is filled with ballast. Further, the ties are only attached at the lower most portions of the legs and do not prevent excessive bulging of the sidewalls higher up in legs. They may also interfere with ballast from evenly filling the bottom portion of the legs. Further the cables or cords weaken the walls where they extend through the walls. Also, with the ballast material contained in only one large compartment with fluid communication throughout, the safety and purpose of the weight may come under threat if the exterior of the fabric is damaged during the often rough installation process—free flow of the contents would likely occur.

There is therefore a need to provide a weighting bag which is flexible but with a system that prevents excessive bulging of the bag in a compartmentalized manner, can be filled with ballast material and handled easily. There is also a need to provide a flexible bag weighting system which is inexpensive to manufacture.

SUMMARY

It is an object of the present disclosure to obviate or mitigate at least one disadvantage of previous systems.

In a first aspect, the present disclosure provides a weighting device for a longitudinally-extending conduit. It is made from a flexible material and is adapted to receive and hold ballast material, such as gravel and coarse sand. The weighting device comprises a top loading main body for receiving ballast material. The main body has a pair of leg sections and may also have an upper, open top section. Each leg section has a floor panel, a pair of opposing end walls, an inner sidewall extending between the end walls, and an outer sidewall opposite to the inner sidewall and extending between the end walls. The inner sidewall of one leg section is connecting to the inner sidewall of the other leg section at a point above the leg section floor panel and forms a conduit-accepting space between the leg sections. The leg sections are adapted to be positioned in straddling relation over a conduit with the conduit embraced in the space between the leg sections. The main body also includes at least one inner panel extending between the inner and outer sidewall of each of the leg sections to prevent excessive bulging of the leg section when filled with ballast material. In one aspect, the inner panel will also connect the sidewalls of opposing leg sections and extend partially or entirely to the top of the leg sections. The panel divides the leg section into separate compartments. In a further aspect, the main body will have one or more panels forming two or more compartments. The weighting device may also include a plurality of filling loops, preferably attached to the inner panel, and hoisting slings for facilitating hoisting and transport of the weighting device when filled with ballast material. The ballast material introduced into the main body will flow into the leg sections on either side of the inner panel. In a further aspect, the flexible material is a woven material and in a still further aspect, it is a breathable, woven material.

Other aspects and features of the present disclosure will become apparent to those ordinarily skilled in the art upon review of the following description of specific embodiments in conjunction with the accompanying FIGURE.

BRIEF DESCRIPTION OF THE DRAWINGS

Embodiments of the present disclosure will now be described, by way of example only, with reference to the attached FIGURE.

FIG. 1 is a perspective view of one aspect of the weighting system of the present disclosure.

DETAILED DESCRIPTION

Generally, the present disclosure provides a system for weighting a longitudinally extending conduit using a containment weighting system. In one aspect, the weighting system is made of flexible material and will hold ballast material, such as gravel and coarse sand.

The present weighting device finds application, inter alia, in connection with subterranean emplacements. In such environments, buoyant hydrostatic forces might tend to "float" a trench-installed conduit, notwithstanding any countervailing influence of backfill overburden. In addition, the current of any hydraulic flows associated with the local ground water might also encourage the conduit to be displaced from its intended location.

While the present weighting device is not necessarily constrained in its application to any particular type of conduit, it is nevertheless especially valuable in connection with pipelines, and in particular with petroleum, petrochemical, or other chemical pipelines.

In accordance with one aspect of the present disclosure, there is provided a conduit weighting device for supportingly receiving therein a charge of ballast material having an associated unit weight. The ballast material is received in contained relation within an enclosure that is circumscribed on all sides by upwardly extending walls of the weighting device. These walls are adapted to retainingly confine the ballast charge. The containment means is adapted to be positioned in saddling relation over a conduit, to thereby at least partly counter displacement forces that might otherwise effect the positioning of the conduit.

With reference to FIG. 1, an example of a weighting device in accordance with the present disclosure is shown. The weight device has a main body 1 with two leg portions 3 and 5. The leg portions include a floor panel 6, inner sidewall 8, and outer sidewall 10. These walls may be separate pieces of material but preferably are one piece.

Between the lower sections of the leg portions is a conduit receiving portion 7. The longitudinally extending conduit is positioned between the lower sections of the leg portions so that each leg extends on opposing sides of the conduit. The portion of the weighting device above the conduit receiving section is not a separate portion of the main body but is in full communication with each of the leg portions. Further, its base is preferably an extension of the inner sidewalls of the legs and not a separate floor panel. It is also possible that the conduit receiving portion may extend up to the upper open top section 2. However, in one aspect shown in FIG. 1, some of the ballast material is positioned above the conduit receiving portion and some of the ballast material is positioned on either side of the conduit in the leg portions of the weighting device.

FIG. 1 shows an open top section 2 at the upper end of the leg sections. In one aspect, the weighting device includes the top section. This open top section allows for ballast material to be more easily loaded into the main body 1. The top section may also include a closing means, such as a draw cord to cinch the top section closed, for retaining the ballast material.

Inside the main body 1 are inner panels 4. FIG. 1 shows 3 inner panels but any suitable number may be used. The inner panels extend between the inner and outer sidewalls of each leg. They may also extend partially or entirely (as shown in FIG. 1) to the top of the leg portions and connect the outer sidewalls 10 of opposing leg portions. The panels divide the main body into separate sections and cause the ballast material to be divided into separate sections during filling of the weighting device. The panels 4 prevent the leg portions from excessive bulging when filled with ballast material and if they extend partially or entirely to the top of the leg sections will also prevent the sidewalls from excessive bulging. They also maintain the ballast material in separate compartments within the bag to increase safe distribution of the ballast material, (i.e. increased safety factor with lower weight per compartment).

The main body may also include one or more ties 11, as shown in FIG. 1. This tie extends across the top of the main panels. It helps prevent bulging of the end walls and, if connected to the top of the panels 4 as is preferred, may also maintain the panels upright and the sections open during filling with ballast material. The tie may extend only over the top of the panels 4, or may connect to the end walls, as shown in FIG. 1.

In one aspect, the walls are particularly adapted to provide substantial isolation of the ballast charge from external hydraulic flows. This is particularly significant in situations where any substantial proportion of the unit weight of the ballast comprises other than coarse mineral materials. Finer materials otherwise might be carried off under the influence of any significant hydraulic flows, thereby diminishing the unit weight of the ballast, and opening the door to the possibility that a ground water buoyant effect might exceed the ability of the remaining ballast to resist the anticipated conduit displacement forces.

Moreover, when unconsolidated material is relied upon to secure a conduit emplacement, the unit weight which actually acts to secure the conduit in place is limited primarily to the mass of the vertical overburden and the mechanical shear characteristics thereof. Accordingly, in situations of the type wherein a vertical overburden, such as trench backfill for example, is relied upon to hold the conduit in position, a certain minimum height of overburden, (typically specified in the art as a "unit weight" parameter of any particular overburden material), is required to deal with any anticipated displacement forces. In accordance with the present invention, however, the unit weight of an enclosed but otherwise unconsolidated ballast material can be made to bear on the conduit in resisting displacement thereof, without necessarily having the ballast material arranged vertically above the conduit. The emplacement in such situations therefore need not necessarily be as deep when the present invention is employed.

In one aspect, the walls of the weight device are formed from a flexible material. In particular, such embodiments are relatively inexpensive to manufacture, yet can be produced from suitably durable materials. Naturally, the selected material should stand up well to subterranean conditions associated with in-ground pipeline emplacements, and other environmental effects to which any other particular application might lead them to be exposed. In one aspect, the flexible material is a woven material and in a further aspect, it is a breathable, woven material. While any number of appropriately environmentally-stable materials will undoubtedly occur to the person skilled in the relevant art, examples of such include heavy gauge polymer products such as, by way of example only, polypropylene, polyester or nylon fabrics. Moreover, the resulting devices tend to be both lightweight and compact. They can be mass produced, stored without consuming undue amounts of storage space, and the production lead time required for making them available in commercial quantity is relatively short, thereby easing a logistical constraint that heretofore has always been a concern in organizing pipeline lying and repair projects.

In a further aspect, the main body is made mainly from a unitary fabric web, wherein portions of the web correspond to respective wall portions adapted to be mutually secured in enclosure defining relation. Where stitching is utilized in the construction, a predetermination of the anticipated loading to which the stitched seams will be exposed should be undertaken. This is well within the extant skill in the present and related arts. The weighting device may also include reinforcement along a portion of or the entire stitched seams.

Use of flexible materials, in accordance with one aspect of the disclosure, allows for the weight of the contained ballast, in a quantum predetermined by buoyancy offsetting design criteria, to be borne other than by the top of the pipe. The mass of material in the lower leg portions of the containment means (as might by analogy be referred to as "saddle bag" portions), need only be exerted on the top of the pipeline in response to buoyant displacement forces. In this sense, the present system is dynamically responsive to the amount of buoyancy the water exerts. In the absence of buoyant displacement forces, the pipeline only need bear the unit weight of the vertically immediate overburden.

In a further aspect, the weighting device includes filling loops 13 and hoisting straps 14. The filling loops are commonly used with flexible bulk bags to maintain the top of the bag open during filling. They may also help to manoeuvre or lift the weighting device during or after filling. FIG. 1 shows 10 filling loops but any suitable number of filling loops may be used. In one aspect, the filling loops are attached on the sidewalls of the main body. In a further aspect, they are attached on the inner panels 4. FIG. 1 shows the filling loops attached to the end walls 6 and inner panels 4. This allows the main body and inner panels to be kept open and taunt to allow the ballast material to enter each of the compartments defined by the inner panels and main body. The hoisting straps are commonly used to hoist, relocate and maneuver the weighting device into position over the conduit. The hoisting straps in FIG. 1 include both fixed hoisting straps and floating hoisting straps. FIG. 1 shows two fixed hoisting straps 14, each extending between two adjacent corners of the weight device. FIG. 1 also shows two floating hoisting straps 9. These floating hoisting straps 9 extend around the end walls and through the conduit receiving portion 7 to encircle the center portion of the weighting device. In one aspect, the floating hoisting straps 9 are not attached to the walls of the weighting device directly. Instead, they are held in place by belt-type loops 12 spaced along the length of each floating strap. The floating hoisting straps 9 extend through the loops 12 which hold the straps in position. In a further aspect, the floating hoisting straps may be attached to the weighting device at one or more points. When the weighting device is filled with ballast material, it is lifted using one or more of the fixed hoisting straps 14 and the floating hoisting straps 9. In one aspect, the two floating straps not only help in the hoisting of the bag but also to maintain the shape of the conduit accepting space and keep the legs from splaying too much during lifting. If the legs splay or open too much during lifting/hoisting, the weighting device may become two wide to fit in the trench and over the pipe. Although FIG. 1 shows two hoisting straps 14, each extending between two adjacent corners, and two floating hoisting straps 9, extending around the weighting device and through the conduit receiving portion 7, any suitable number, arrangement, and length of hoisting straps may be used.

The filling and hoisting straps are used to effect and maintain a predetermined, general conformation during and following the introduction of ballast and/or to facilitate installation of the device within the emplacement. Once the filling and hoisting straps are relieved, with the device duly positioned within the emplacement, the device relaxes and takes up the above mentioned straddling relation over and around the adjacent pipeline surfaces.

In the preceding description, for purposes of explanation, numerous details are set forth in order to provide a thorough understanding of the embodiments. However, it will be apparent to one skilled in the art that these specific details are not required. The above-described embodiments are intended to be examples only. Alterations, modifications and variations can be effected to the particular embodiments by those of skill in the art without departing from the scope, which is defined solely by the claims appended hereto.

The invention claimed is:

1. A weighting device for a longitudinally-extending conduit, said weighting device made from a flexible material and comprising:
   i. a top loading main body for receiving ballast material, said main body having a pair of leg sections, each leg section having a floor panel, a pair of opposing end walls, an inner sidewall extending between the end walls, and an outer sidewall opposite to the inner sidewall and extending between the end walls; the inner sidewall of one leg section connecting to the inner sidewall of the other leg section and forming a conduit accepting space; whereby said leg sections are adapted to be positioned in straddling relation over a conduit with said conduit being embraced in said conduit accepting space between the inner sidewalls of said leg sections;
   ii. at least one inner panel extending between the inner and outer sidewall of each of the leg sections to prevent excessive bulging of the leg section when filled with ballast material, and extending between the outer sidewalls of the main body along the height of the sidewalls, wherein the panel divides the leg section and main body into independent compartments;

iii. a plurality of filling loops attached to at least one of the at least one inner panel of the main body;

iv. wherein the ballast material introduced into the main body will flow into the independent compartments.

2. The weighting device of claim 1 wherein the main body comprises two or more inner panels extending between the inner and outer sidewalls of the leg sections.

3. The weighting device of claim 1 wherein the main body further comprises at least one band attached to and extending between the end walls of the leg sections and further connecting to a top edge of the at least one inner panel.

4. The weighting device of claim 1 further comprising one or more of:

ii. a plurality of hoisting slings for facilitating hoisting and transport of the weighting device when filled with ballast material.

5. The weighting device of claim 4 wherein the plurality of filling loops comprises two filling loops attached to said at least one inner panel, each of said two filling loops attached near opposing ends of said at least one inner panel, at or near the leg section sidewall.

6. The weighting device of claim 4 wherein the plurality of hoisting loops comprises two or more hoisting loops.

7. The weighting device of claim 6 wherein the plurality of hoisting loops comprises two or more fixed hoisting loops attached at or near opposing sides of the main body.

8. The weighting device of claim 7 wherein the open top section further comprises means for substantially closing the open top section.

9. The weighting device of claim 6 wherein the plurality of hoisting loops comprises floating hoisting loops.

10. The weight device of claim 9 wherein the floating hoisting loops extend around the main body and through the conduit accepting space.

11. The weighting device of claim 1 further comprising an open top section for receiving ballast material for filling the main body.

12. The weighting device of claim 1 wherein the flexible material is a woven material.

13. The weighting device of claim 12 wherein the woven material is a breathable woven material.

\* \* \* \* \*